UNITED STATES PATENT OFFICE.

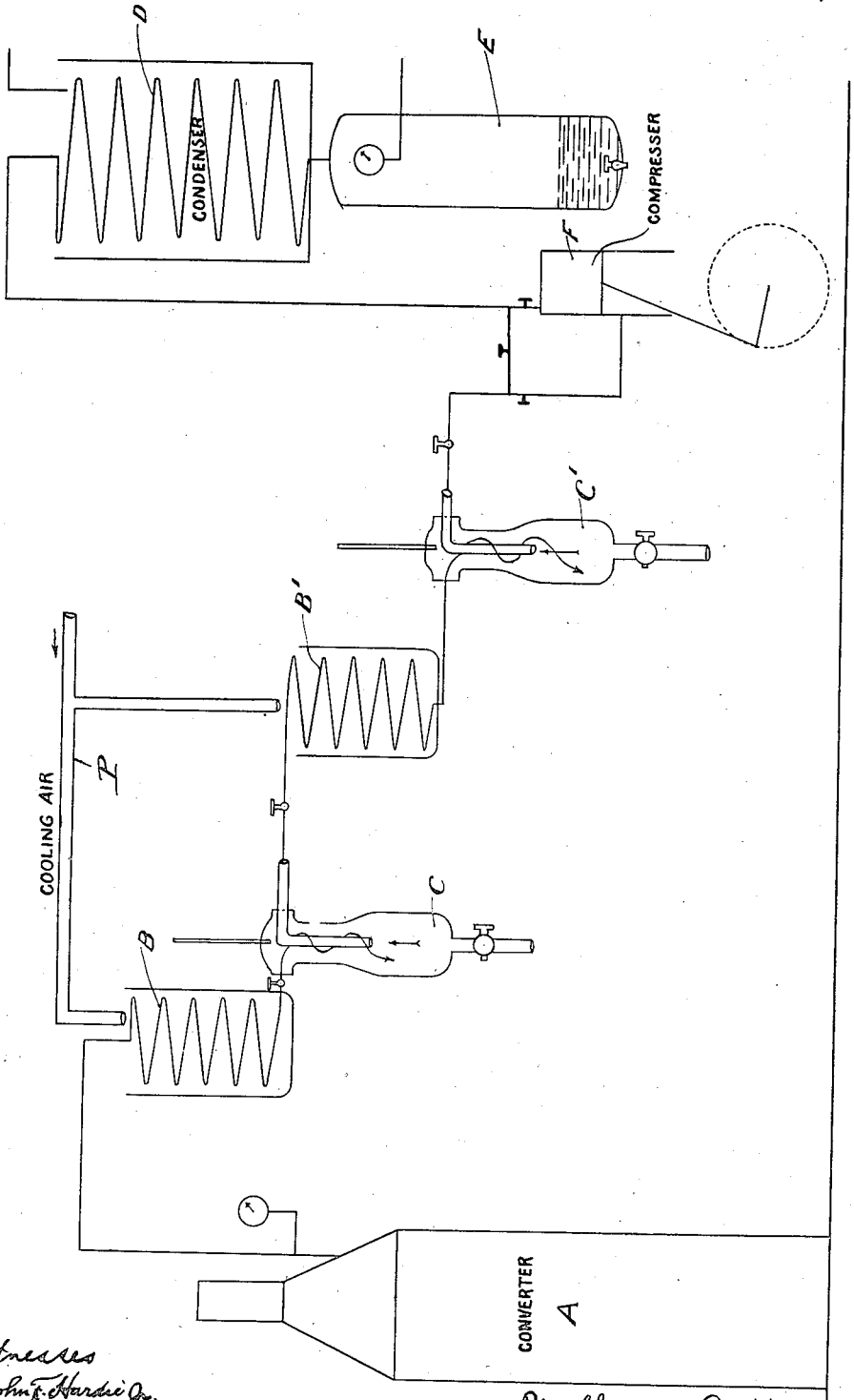

WILLIAM AUGUSTUS HALL, OF NEW YORK, N. Y.

PROCESS FOR THE PRODUCTION OF MOTOR-SPIRIT FROM HEAVY HYDROCARBONS.

1,242,795.  Specification of Letters Patent.  Patented Oct. 9, 1917.

Application filed March 12, 1914. Serial No. 824,194.

*To all whom it may concern:*

Be it known that I, WILLIAM AUGUSTUS HALL, a citizen of the United States of America, and residing at New York city, New York, United States of America, have invented a certain new and useful Improvement in Processes for the Production of Motor-Spirit from Heavy Hydrocarbons, of which the following is a specification.

This invention relates to an improved process for the production of a liquid motor fuel suitable for use in the usual carbureters of internal combustion engines, from heavier and less volatile hydrocarbons.

The said improved process contemplates the chemical affixation of a hydrocarbon gas to vaporized, normally liquid, chemically unsaturated hydrocarbon, the said gas and liquid having the properties hereinafter specified; there being produced a fourfold effect:

First, a greatly increased volume of fuel produced, over the volume obtained by any of the processes depending entirely upon cracking, with which I am familiar;

Second, a materially lower boiling point than that of said unsaturated hydrocarbon, or of ordinary gasolene obtained by cracking heavier oils;

Third, a lower specific gravity than that of said unsaturated hydrocarbon, or of ordinary gasolene obtained by cracking heavier oils, and Fourth, greatly increased fractions volatile at comparatively low temperatures, as compared with said unsaturated hydrocarbon, or with ordinary gasolene.

The process forming the subject matter of my present application is not a process of hydrogenation, in the ordinary meaning of that term, for very little free hydrogen is present (either from the cracking or from any other source) and, as far as I have been able to ascertain, none is utilized in any part of the process, and no nickel or other metallic catalyst is present in any part of the apparatus.

My present process is, on the contrary, a process of producing gases containing considerable amounts of condensable hydrocarbons, such as propane, butane, pentane, and hexane and the subsequent affixation of these gases to the vapors of an unsaturated hydrocarbon herein referred to as "liquid base".

In order to produce satisfactory results, in accordance with the present process, it is necessary that the "liquid base" and the gases should both be of the proper character. The "liquid base" should best contain considerable quantities of unsaturated hydrocarbons, in order to make the chemical affixation of the gases take place readily. Under certain conditions, however, it appears that some of the gases are chemically affixed to saturated, as well as to unsaturated bodies. The gas must contain considerable amount of hydrocarbons containing at least two or three carbon atoms and can not consist entirely, or even principally of hydrogen and methane, if good results are to be secured. It is preferable that the gases also contain some unsaturated hydrocarbons.

The preferable "liquid base" is that volatile liquid of which the vapors exist (mixed with gases) in the vaporous product produced by cracking a relatively heavy hydrocarbon oil under a pressure of (e. g.) about 70 pounds per square inch and at about 600 or 650° C. This temperature is measured by a pyrometer placed between the vertical pipe coils in the furnace A. Thereafter I cool the gases and vapors to a temperature of about 200° C., with or without more or less lowering of pressure. Such a "liquid base" can be produced in other ways, and it is particularly characterized in that it consists essentially of normally liquid hydrocarbons, whose vapors, if cooled under a pressure of about 70 pounds per square inch, with a wet gas (having the composition above referred to), will unite chemically with constituents of said gas, to produce a motor fuel. The said vaporized "liquid base" and gas must be present together at a temperature materially above atmospheric, for example 100 to 200° C., and under pressure, to produce this union.

The motor fuel does not appear to consist of the "liquid base" with the gases dissolved therein, since the product can be distilled without the loss of more than small amounts of the gaseous portions which have been affixed to the "liquid base". If the product were solely a solution of the gases in the "liquid base", the gases would be lost if the product were distilled. Of this "liquid base", the more volatile portions especially, usually contain large amounts (say 30 to 50%) of hydrocarbons of the ethylene series, unsaturated hydrocarbons.

This "liquid base", in the preferred mode of execution of the process, is made by cracking a cheap hydrocarbon, for instance, a distillate such as gas oil. A suitable gas oil is one having a specific gravity of from about 34 to about 40° Bé. and an initial boiling point of from about 80 to about 180° C.

A construction of apparatus suitable for the performance of the improved process is illustrated diagrammatically in the figure of the accompanying drawing.

Referring to the drawing, A denotes a converter in which the gas oil is subjected to a temperature of about 650° C., under a pressure of about 70 pounds per square inch, whereby the oil is cracked and a considerable portion gasified. From the converter A the mixture of oil vapor and gas is passed through suitable coolers B, B' (cooled by a suitable fluid introduced through pipes P) whereby the temperature of the mixture is lowered to about 200° C. C, C' denote separators in which the major part of all fractions non-volatile at about 200° C. is removed, in the liquid state, from the remaining gases and vapors. The vapors of liquid, which are volatile at a temperature of approximately 200° C., together with any mist of condensed liquid particles which may be carried along, together with the gases present, may then be conducted directly through a cooler or condenser D, under approximately the pressure of the converter, and the condensate collected in the receptacle, E or may be still further compressed by means of a mechanical compressor indicated conventionally at F. The liquid, the vapor of which passes with the gas to the compressor is that herein referred to as the "liquid base".

Such a liquid is itself not a satisfactory fuel for motor cars. It is this liquid which unites with the gases, during the compression and subsequent cooling, to produce the motor fuel.

In some respects this "liquid base" is similar to the well known cracked hydrocarbon spirits at present produced by cracking oils of higher boiling points than ordinary gasolene, such as crude oil or solar oil which have little or no value as a motor car fuel unless redistilled and cut at a low temperature, e. g. about 150° C., at which point the yield is very small.

In a converter, I produce the vapors of such a "liquid base", but in the final condensation I obtain a product having a low boiling point, and a large fraction volatile at low temperatures, the product being different from the "liquid base", on account of the affixation of gases thereto.

The "liquid base" may, for example be made by heating to a temperature of above 500° C., an oil known as "Crown Diamond paraffin oil", a low grade burning oil of about .815 specific gravity. The "liquid base" so produced is a product having a gravity of about .769 (at 15° C.), and which has the following distillation table:—

| | |
|---|---|
| First drop | 31° C. |
| Total distillate up to 50° C. | 1 % |
| " " " " 60 | 2 % |
| " " " " 80 | 6 % |
| " " " " 100 | 14 % |
| " " " " 150 | 50 % |
| " " " " 160 | 57 % |

Such a "liquid base" or half product is found to be an excellent medium, to which to affix the wet gas. The product produced by compressing the vapors of this "liquid base", with the gases present was a product with a gravity of .755 (at 15° C.) with the following distillation table:

| | |
|---|---|
| First drop | 30° C. |
| Total distillate up to 50° C. | 2 % |
| " " " " 60 | 5 % |
| " " " " 80 | 15 % |
| " " " " 100 | 23 % |
| " " " " 150 | 48.5% |
| " " " " 160 | 60 % |

The invention is, of course, not limited to this specific example, which is given merely for the purpose of showing the difference between the "liquid base" and the "motor fuel." On account of the chemical affixation produced, I am to cut the spirit at a high temperature, say 200° C., or even high, (as compared with 150, in the case of "cracked gasolene"), thereby obtaining a much greater yield and more calorific value.

If desired I may so conduct the operation in the converter as to produce the desired qualities and quantities of gas and "liquid base," which with some oils such as gas oil and heavy distillates above the lubricant fractions can be obtained by the cracking of said oils at about 650° C. under 70 to 80 pounds pressure, while maintaining the proper speed of flow. In this way there is produced a large amount of gas, which if separated, would remain as a permanent gas at ordinary atmospheric conditions, but a large portion of which gas will combine chemically with the spirit portion of the "liquid base" after the tarry and heavy residues have been removed, provided the gases and the "liquid base" (while the latter is in a state of vapor) be subjected to sufficient pressure, while at a temperature of from 100° C. to 200° C.

Certain oils do not readily respond to the cracking process and from such oils a sufficient amount of the desired "liquid base" cannot be obtained to supply the medium for the affixation of the gas produced. Yet such oils may produce with ease large quantities of the gas desired. In such cases it may be found desirable to produce the gas or the largest portion of it from one oil, and the "liquid base" from another oil, and to combine them in the manner herein set forth.

I am aware that heavy hydrocarbon liquids have been charged with hydrocarbon gases, as is done in the production of the so-called "natural gas gasolene" or "casinghead gasolene," but such processes, as far as I am aware, are based in most cases on the principle of solution and accomplished by high pressure and refrigeration, it being known that most gases are far more soluble in cold solvents than in hot. I believe, however, that it has not heretofore been proposed to affix such gases chemically to a "liquid base" while the latter was at a high temperature and in a state of vapor, the "liquid base" being a spirit obtained by cracking and containing a large proportion of ethylene hydrocarbons which "liquid base" is effective for the chemical affixation of hydrocarbon gases.

It is to be noted that in carrying out the process of the present application, I preferably do not add water, hydrogen or gases containing hydrogen, or carbon monoxid to the oil or oil vapors. Also I do not treat the gases and vapors with any catalytic material.

While I have stated that the pressure in the coils B, B', C, and C' may be much lower than in the converter A, this feature is not claimed herein, but in my copending application No. 829,634, filed April 4, 1914.

I claim:—

1. A process of making a motor fuel which comprises producing a mixture of vapors and gases, said vapors containing a considerable percentage of compounds of the ethylene series, by cracking hydrocarbon oil under a pressure materially above atmospheric and at a temperature not lower than about 500° C., separating out those portions of the vapors having boiling points of about 200° C. and above, leaving a mixture of gases and vapors at a temperature of over 100° C., and thereafter cooling said mixture including the gases and remaining vapors while under a pressure materially above atmospheric, to condense out a motor fuel.

2. A process of making a motor fuel which comprises heating portions of different hydrocarbon oils, to temperatures in excess of 600° C., under a pressure materially above atmospheric, cooling the gases and vapors thereby produced, down to at least about 200° C. but not down to 100° C., to condense products having high boiling points, and removing at least the major part of the condensate from the remaining gases and vapors, subjecting the remaining gases and vapors thereby produced while still in a heated condition, to pressure materially above atmospheric, and finally further cooling the gases and vapors while under a pressure materially above atmospheric to condense out the motor fuel.

3. A process of producing a motor fuel, which comprises cracking a hydrocarbon oil under a pressure materially above atmospheric, at a temperature sufficiently high to convert a portion of the oil into fixed gases, and to produce vapors containing considerable percentages of unsaturated hydrocarbons; cooling the vapors and gases sufficiently to cause the portions having boiling points of about 200° C., to condense out; and thereafter subjecting the resulting gases and vapors at a temperature of 100 to 200° C., to a pressure of not less than about 70 pounds per square inch, to produce a chemical affixation of the gases and vapors.

4. A process of making a motor fuel, which comprises cracking a mineral oil under a pressure of several atmospheres, at a temperature of above 500° C., cooling the gases and vapors, while still under a pressure of several atmospheres, to a temperature of not over about 200° C., to separate out materials having high boiling points, thereby producing a mixture containing the gases and containing the vapors of those portions which remain in vapor form at the temperature employed in said step, subjecting said mixture to a pressure above that used in the said cooling step, and thereafter cooling said mixture while under a pressure at least as great as that employed in the cracking operation, to condense out the motor fuel.

5. A process of making a motor fuel from hydrocarbons of higher boiling points, which comprises cracking said hydrocarbons by passing the same through a chamber at a temperature of about 600° C., under a pressure of several atmospheres, separating from the gases and vapors thereby produced, a part at least of the constituents thereof which have boiling points above 200° C., thereby producing a mixture of gases and non-condensed vapors at a temperature of 100 to 200° C., subjecting said mixture to a pressure materially above atmospheric, and thereafter cooling said mixture under a pressure not less than that used in the first step, to condense out the motor fuel.

6. A process of making a motor fuel which comprises cracking hydrocarbon oils at 600 to 650° C., under a pressure of about 70 pounds per square inch, thereafter cooling the resulting gases and vapors to about 200° C., to separate the most readily condensable portions therefrom, subjecting the remaining gases and vapors to a pressure of at least about 70 pounds per square inch, and cooling the same while under a pressure of several atmospheres, to condense out the motor fuel.

7. A process of making a motor fuel from hydrocarbons of higher boiling points, which comprises cracking said hydrocarbons by passing the same through a chamber at a temperature of at least 600° C., under a pressure materially above atmospheric, separating from the gases and vapors thereby produced, while still under a pressure materially above atmospheric, a part at least of the constituents thereof having boiling points above 200° C., then cooling the remaining gases under a pressure not less than that used in the first step, to condense out the motor fuel.

8. In the manufacture of motor fuel, the improvement which comprises subjecting to a pressure of about four atmospheres, a mixture including hydrocarbon gases and also including those portions of the vapors of a cracked hydrocarbon liquid which are volatile at about 200° C., without material amounts of hydrocarbons having boiling points much above 200° C., and thereafter cooling the remaining mixture of gases and vapors while under a pressure of several atmospheres substantially as described.

9. In the manufacture of motor fuel, the herein described improvement which comprises chemically affixing hydrocarbon gases to a vaporizing "liquid base," composed of hydrocarbons liquid at ordinary temperature, the larger part of which are volatile at a temperature of about 200° C., by subjecting a mixture of said materials to a pressure materially above atmospheric, while at a temperature not materially below 100° C., and thereafter cooling the resulting mixture under a pressure materially above atmospheric to condense the motor fuel.

In testimony whereof I have signed my name to this specification in the presence of two subscribing witnesses.

WILLIAM AUGUSTUS HALL.

Witnesses:
   H. D. JAMESON,
   G. C. FRANCIS.